United States Patent Office 3,496,219
Patented Feb. 17, 1970

3,496,219
METHOD OF PREPARATION OF TERTIARY
ALKYL ESTERS OF AMINO ACIDS
David W. Young, Homewood, Ill., assignor to Sinclair
Research, Inc., New York, N.Y., a corporation of
Delaware
No Drawing. Continuation of application Ser. No.
347,675, Feb. 27, 1964. This application July 22,
1968, Ser. No. 749,255
Int. Cl. C07c *101/18, 101/06*
U.S. Cl. 260—471                5 Claims

ABSTRACT OF THE DISCLOSURE

There is disclosed a method of preparing tertiary alkyl esters of amino acids from a tertiary olefin in liquid phase in the presence of a solid polystyrene sulfonic acid cationic exchange resin catalyst and a dioxane or diethylene glycol solvent.

---

The present application is a continuation of application Ser. No. 347,675, filed Feb. 27, 1964, and now abandoned.

The present invention is directed to a method for the preparation of tertiary alkyl esters of amino acids. Tertiary alkyl esters of amino acids are useful carboxyl-protecting groups in peptide synthesis because they are cleaved readily by acids.

G. W. Anderson and F. M. Callahan reported in J. Am. Chem. Soc., 82, 3359 (1960), the production of esters by reacting N-acylated amino acids with isobutylene. Some amino esters have also been prepared from free amino acids by reaction with t-butyl acetate and perchloric acid. This work was done by E. Taschner, A. Chimiak, B. Botor and T. Sokoloroska, Ann., 646, 134 (1961). None of these methods, however, has been entirely satisfactory since they either involve reactants expensive to prepare, provide poor yields or effect considerable by-product formation.

I have now discovered a method for preparing tertiary alkyl esters of amino acids in surprisingly high yields, ordinarily on the order of about 80 to 85% or more by weight and with a minimum of by-product formation. In accordance with the method of the invention a tertiary olefin and an amino acid dissolved in diethylene glycol or dioxane, including mixtures thereof, are contacted in the liquid phase and under esterification conditions in the presence of a cationic exchange resin catalyst.

The tertiary olefin of the invention is a tertiary alkene of 4 to 6 or even 8 or more carbon atoms. It may be employed as such in the esterification or in admixture with other hydrocarbons. For example, a $C_4$ petroleum refinery stream containing about 10 to 35% isobutylene may be used in the method of the invention as well as pure isobutylene or tertiary olefin-containing streams. A tertiary olefin is a hydrocarbon containing a carbon atom which is joined to two other carbon atoms by a single bond and to a third carbon atom by a double bond.

The amino acid reactant of the invention includes the amino acids having the general formula:

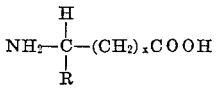

wherein R is hydrogen or a hydrocarbon radical of 1 to 10 or more carbon atoms whose adjacent carbon atoms are no closer than 1.40 A. (i.e. a non-olefinic, non-acetylenic hydrocarbon) and x is an integer of 0 to 4, preferably 0. R can be a straight or branched chain saturated aliphatic (including saturated cycloaliphatic) radical, an aromatic radical or a heterocyclic radical and can be substituted with groups that do not interfere with the esterification. Illustrative of suitable amino acids are mono-amino-monocarboxylic acids such as glycine, glycin (i.e. α-amino-β-p-hydroxyphenyl acetic acid), alanine, phenylalanine, isoleucine, tyrosine, serine, leucine, monoamino-dicarboxylic acids such as aspartic acid and glutamic acid, diamino-monocarboxylic acids such as lysine, ornithine, asparagine; heterocyclic amino acids such as histidine, trypotophane or proline.

The catalyst employed in the esterification can be a solid polystyrene sulfonic acid cation exchange resin in the hydrogen form. These resins include polystyrene material cross-linked with a copolymerizing agent which may be substituted polyene, e.g. diene, triene, etc., such as divinylbenzene. The preferred cationic exchange resin is a strongly acidic solid exchange resin consisting essentially of a divinylbenzene cross-linked polystyrene matrix having about 0.5 to 20%, preferably about 5 to 16%, divinylbenzene therein, to which are attached ionizable or functional nuclear sulfonic acid groups. These resins are manufactured and sold commercially under various tradenames, e.g. Dowex 50, and Nalcite HCR. Resins having particles size of from about 200 to 400 mesh are preferred although smaller or larger sizes can be used if desired.

In conducting the esterification of the invention, it is preferred to first dissolve the amino acid in the dioxane or diethylene glycol before contacting it with tertiary olefin, although the dissolution can be effected simultaneously with the contacting in the presence of the catalyst under esterification conditions. Thus, the dioxane and/or diethylene glycol is present in the reaction mixture in amounts sufficient to place the amino acid reactant utilized into solution. This amount will, of course, vary depending on the particular amino acid reacted but will generally fall in the range of about 2 to 40 ml. per gram of amino acid.

The amount of catalyst employed is that which will catalyze the conversion to the ester and is usually about 0.5 to 35%, preferably 2 to 25% by weight based on the total weight of tertiary olefin and amino acid reactants. The esterification reaction proceeds at room temperature but temperatures in the range of about 15 to 50° C. or more can be utilized. The pressure used is that sufficient to maintain the liquid phase. The contacting may be performed batchwise or a continuous, e.g. countercurrent system may be established for the contacting.

The tertiary ester products prepared by the method of the invention have a branched structure in the alkyl component and the amino acid residue is attached to the same carbon as the branch. The ester products can be represented by the general formula:

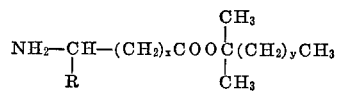

wherein R and x are as defined above and y is an integer of 0 to 4 or more.

The following examples are included to further illustrate the present invention.

EXAMPLE I

Three grams of L-tyrosine was dissolved in a mixture of 25 ml. of dioxane (pure) and 6 g. of Dowex 50–X8, 200–400 mesh. Dowex 50–X8 is a solid cationic exchange resin consisting essentially of polystyrene cross-linked with 8% divinylbenzene. The Dowex was not soluble in the mixture. Twenty-five milliliters of liquid isobutylene was added over a period of 7 hours as the mixture was agitated. After this, the mixture was added to about 75 ml. of ethyl acetate and 100 ml. of cold water. The mixture was filtered, the pH of filtrate adjusted to 8.5 with $NH_4OH$ and the filtrate product extracted three times with ethyl acetate. Evaporation of the solvent left a crystalline residue of 2.24 g., M.P. 143–145° C. The literature gives 143–145° C. for this compound, t-butyl L-tyrosinate.

EXAMPLE II

The ester t-butyl L-tyrosinate can be prepared utilizing the method of Example I but employing diethylene glycol instead of dioxane.

EXAMPLE III

The ester t-butyl lysinate can be prepared by utilizing lysine in place of L-tyrosine in Example I.

EXAMPLE IV

The ester B-t-butyl L-aspartate can be prepared utilizing aspartic acid in place of L-tyrosine in Example I.

EXAMPLE V

The ester t-butyl glycinate can be prepared by substituting glycine for the L-tyrosine in the method of Example I.

It is claimed:

1. A method for the preparation of tertiary alkyl ester of amino acids which consists essentially of reacting in the liquid phase a tertiary alkene of 4 to 8 carbon atoms with an amino acid having the general formula:

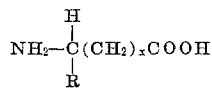

wherein R is selected from the group consisting of hydrogen, a saturated hydrocarbon and aromatic hydrocarbon radicals of about 1 to 10 carbon atoms and $x$ is an integer of 0 to 4, dissolved in a material selected from the group consisting of dioxane and diethylene glycol in the presence of a catalyst consisting essentially of a solid polystyrene sulfonic acid cationic exchange resin in the hydrogen form.

2. The method of claim 1 wherein the integer $x$ is 0.

3. The method claim 1 wherein the catalyst is a divinylbenzene cross-linked polystyrene sulfonic acid cationic exchange resin in the hydrogen form and the reaction is at a temperature of about 15 to 50° C.

4. The method of claim 1 wherein the amount of catalyst is about 2 to 25% by weight based on the total weight of the amino acid and tertiary alkene.

5. The method claim 4 wherein the tertiary alkene is isobutylene.

References Cited

UNITED STATES PATENTS 3,243,423   3/1966   Beyerman _____ 260—471

OTHER REFERENCES

Sussman, S.: Catalystic Applications of Ion Exchangers (1949), Industrial and Egineering Chemistry, vol. 38, No. 12, pages 265–268 relied on.

LORRAINE A. WEINBERGER, Primary Examiner

L. ARNOLD THAXTON, Assistant Examiner

U.S. Cl. X.R.

260—309, 326.3, 482